UNITED STATES PATENT OFFICE.

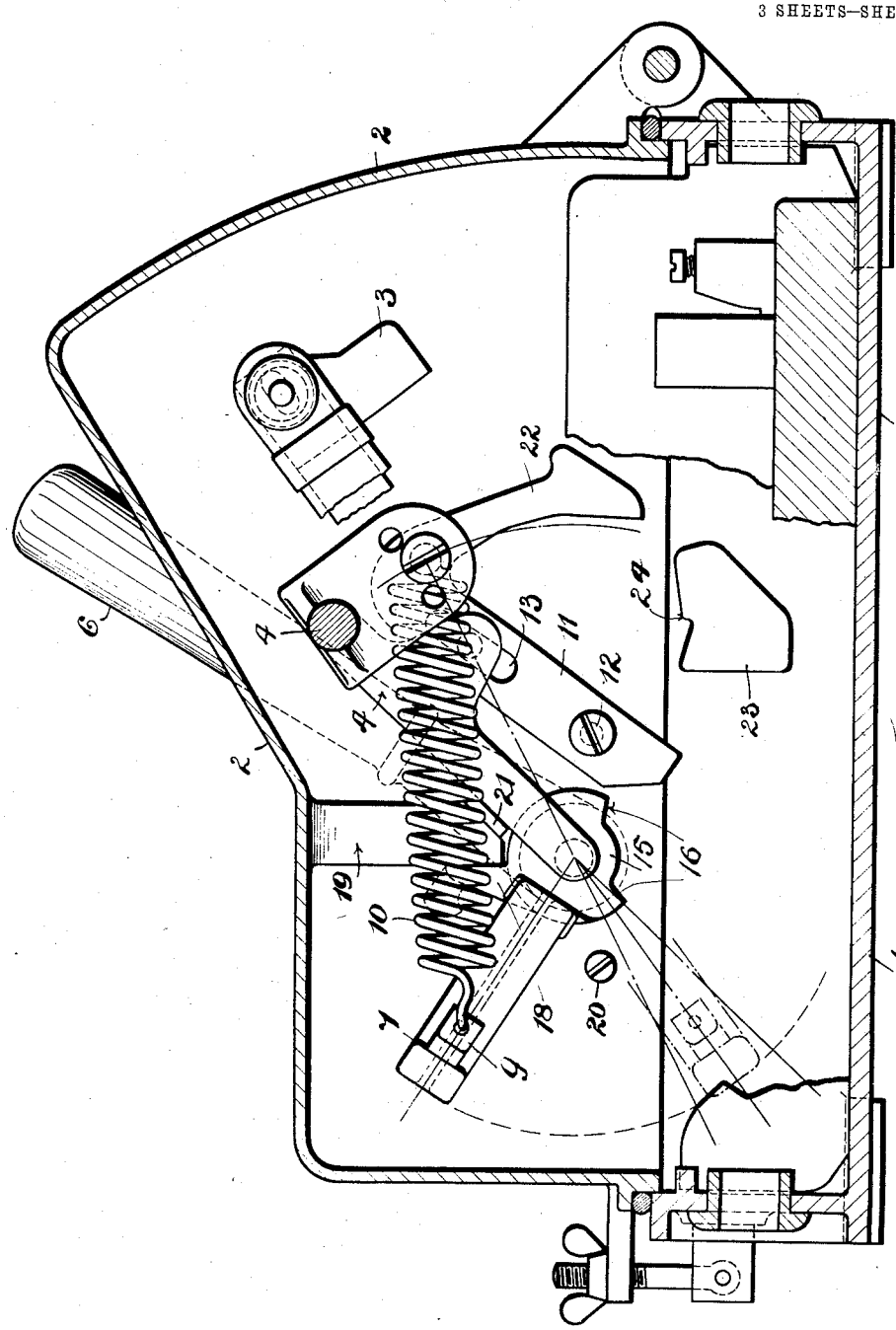

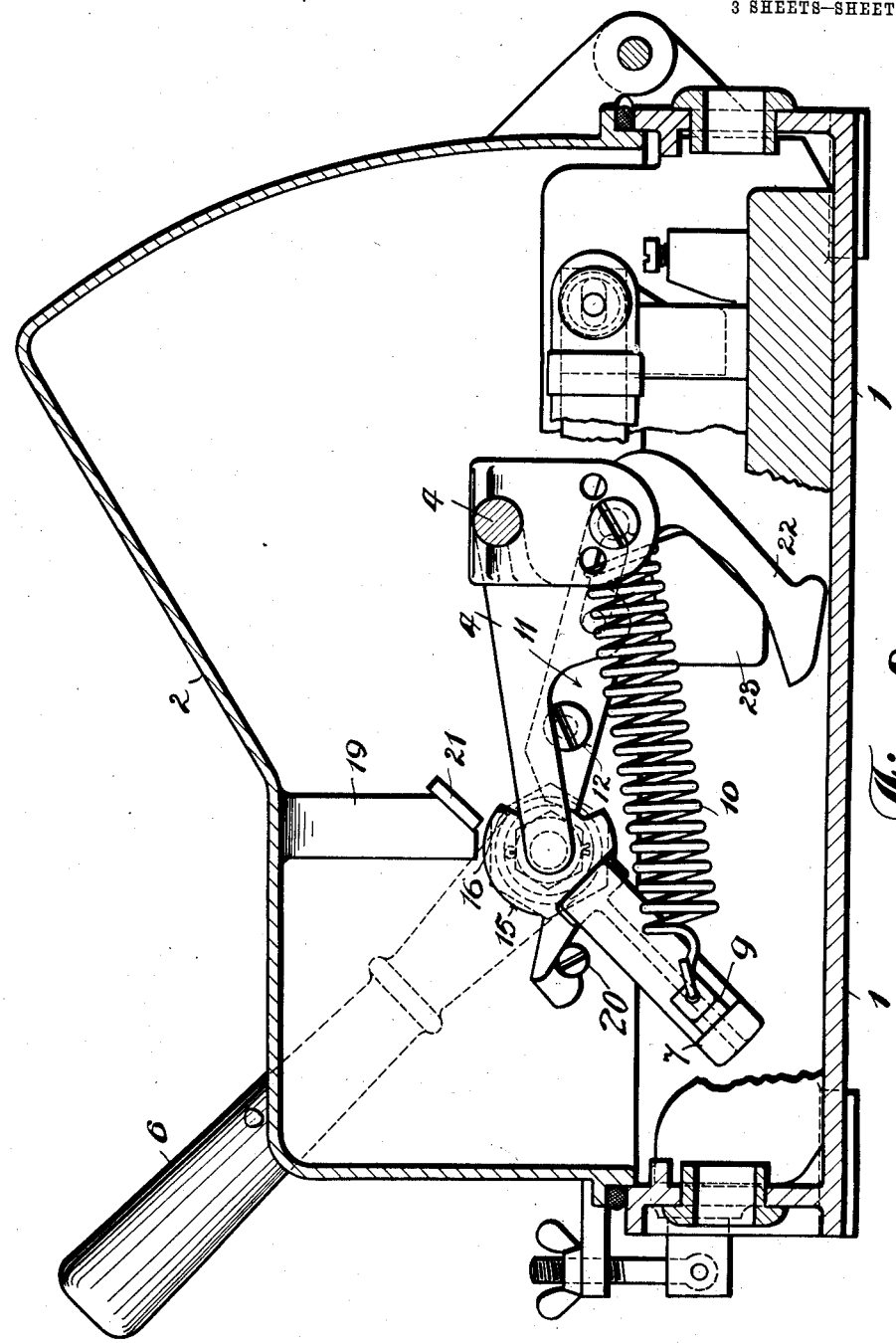

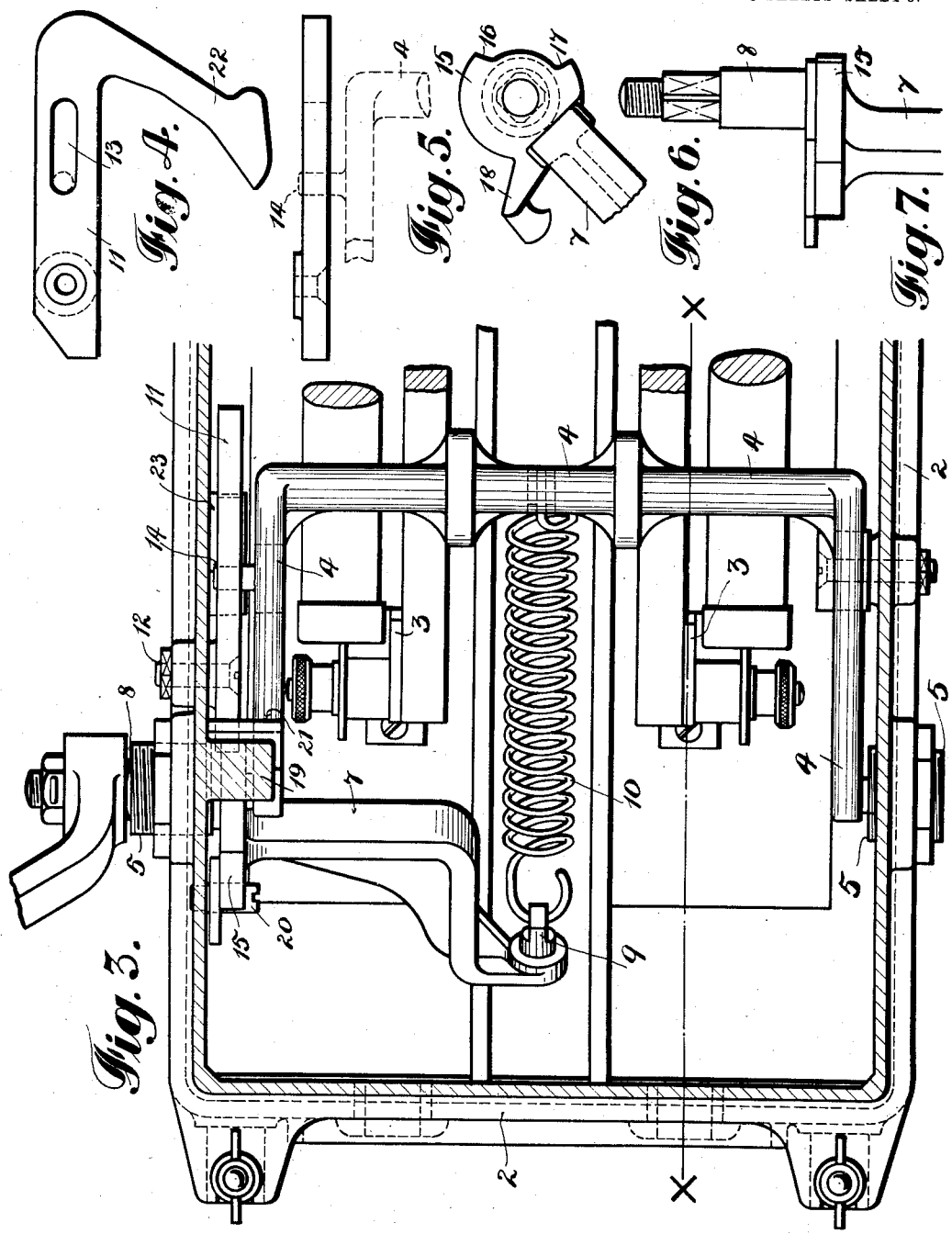

VERNON HOPE, OF MANCHESTER, ENGLAND.

IRON-CLAD ELECTRIC SWITCH.

986,570.  Specification of Letters Patent.  Patented Mar. 14, 1911.

Application filed August 10, 1909. Serial No. 512,219.

*To all whom it may concern:*

Be it known that I, VERNON HOPE, a subject of the King of Great Britain and Ireland, and residing in Manchester, England, have invented new and useful Improvements Connected with Iron-Clad Electric Switches, of which the following is a specification.

The invention herein described relates to iron-clad electric switches (or combined switches and switch fuses) in which the switch blades, in making and breaking the electric circuits, act independently of the operating handle and with sufficient force to make or break the circuits as soon as the handle has been moved to a given point for turning the current off, thereby guarding against the risks of the switch blades being slowly operated and only partially engaging or disengaging the contacts.

The improvements constituting this invention are illustrated upon the accompanying drawings, wherein—

Figure 1 illustrates a longitudinal section of an iron-clad switch with the improvements applied, the switch blades and their fuses being broken away in order to more clearly show the parts which constitute the invention, which in this view are in the current-off position. Fig. 2 illustrates a like view but with the parts in the current-on position. Fig. 3 illustrates a plan of Fig. 2 partly in section and partly broken away. Figs. 4, 5 and Figs. 6 and 7 illustrate side elevations and plans respectively of certain detail parts hereinafter more fully described.

As shown 1 is the box or base part and 2 the hinged cover part of the iron casing in which the usual switch blades 3 (and their fuses) are inclosed.

4 is the cranked shaft or rod, to the cranked parts of which the switch blades are connected, and which rod at its ends takes its bearings in bushes 5 or the like in the side walls of the casing 1 see Fig. 3. According to the improvements, the boss of the handle 6 is extended into the casing and at such point is provided with (or has connected to it) a short arm or crank 7, the handle in this case being loose on the rod 4. In practice this arrangement is produced by using a short tubular part 8 see Figs. 3, 6, and 7, to which is rigidly fixed the handle 6 at one end, and in one with which at the other end is the crank 7. In such tubular part the end of the rod 4 loosely takes its bearing.

It is preferred to mount the improved switch-blade supporting, regulating and operating devices in the cover 2 of the casing, in order that when the casing is opened the devices shall be out of the way. A further object (although not necessarily so) in so mounting the devices is to allow of the devices being (in part) also used for locking the cover to its base and preventing its removal when the current is on and unlocking such cover and preventing the turning on of the current when the casing is open. In such case therefore the part 8 is mounted in the side wall of the cover 2 and the base part 1 is made comparatively shallow, while the cover is made deeper.

To the crank 7, which is provided for the purpose with a small connecting and tensioning screw 9, is connected one end of the spring 10, the other end of such spring being connected to the cranked part of the rod 4. The position of the crank 7 relatively to the axis of the rod 4 and its cranked part is such that, when moved to points on opposite sides of a dead center line, the spring is first tensioned (elongated) and then allowed to exert its full energy to rapidly operate the switches. To aid in this action and to render the withdrawing of the switch blades from engagement with the contacts not entirely dependent on the spring 10, use is made of a lever 11, see Fig. 4, which near one end is pivotally mounted on the plain part of a screw 12, secured to the side wall of the cover 2. In such lever is a slot 13 and by such slot the lever engages a stud 14 on the cranked part of the rod 4, see Fig. 3. Upon the aforesaid boss of the handle 6, or the inner end of the part 8 is a flange 15, and in such flange is a gap, producing shoulders 16, 17, see Figs. 3 and 6. The lever 11 lies in the path of the shoulder 16 when the part 8 is rotated, see Fig. 2. The distance between the shoulders 16, 17 is such as to allow of the free movements of the rod 4 after being moved over the dead center.

When the switch blades are in the current-off position the spring 10 occupies the position shown in Fig. 1 the crank 7, through the medium of an extension 18 on the flange 15, bearing against a "stop" or shoulder 19 on the casing cover 2. When the switch blades are in the current-on position the spring 10 occupies the position shown in Fig. 2, the extension 18 then coming against a fixed stop or stud 20 in order to limit the movements of the handle 6 and afford the necessary resistance to the pull of the spring. When now the handle 6 is moved to switch off current, thereby rotating the flange 15 the shoulder 16 meets the lever to tilt it about its pivot 12 and thereby move the cranked part of the rod 4 away from the switch contacts and the switch blades wholly or partially out of engagement with the contacts, simultaneously putting the spring 10 in tension and moving the transverse member of the cranked part of the rod until it is over the "dead" center when the spring is free to exert its force and effect the rapid movement of the switch blades away from the contacts, the rod 4 coming against a stop 21, see Fig. 1. When it is required to switch on current the handle is moved until the projection 18 meets or almost meets (see dotted lines in Fig. 1) the stop 20, by which time the spring is again tensioned and the transverse member of the cranked part of rod 4 is again over the dead center and the spring free to exert its force in forcing the switch blades into engagement with the contacts.

To prevent the cover 2 being opened until the switch blades are in the current-off position, the pivoted lever 11 is formed with a curved and downwardly extending extension 22, and the switch case 1 is provided with a plate 23 one edge of which is beveled or cut to a radius corresponding to that of the said extension when moved by the lever. When the cover 2 is closed and the current switched on the said extension of the lever moves into a position alongside the beveled or curved edge of the plate and thus prevents the cover being opened until the current is switched off. The same devices serve also for preventing the cover being closed with the switch blades in the "on" position, the lever extension striking the top edge of the plate 23 (which is or may be formed with an indention or formed with a shoulder 24 to prevent the extension slipping its abutment, (see Fig. 1) should the switches be in other than in the "off" position when the lid is closed.

What I claim is:—

1. In iron-clad electric switches, a metal casing comprising a base and cover and means for hinging said parts to each other, a cranked rod mounted transversely in the cover of the casing, tubular parts let into the side walls of cover, one fixed and the other rotatable, and in which the ends of the cranked rod take their bearing, a handle secured to the rotary tubular part outside the casing, and said rotary tubular part carrying the handle having on that end inside the casing peripheral shoulders, a cranked lever arm secured to the rotary tubular part, and a spring connected at one end to the end of the lever arm and at its other end secured to the cranked part of the said cranked rod, a lever pivotally mounted on the side wall of the base of the casing, with one end adjacent to one of the peripheral shoulders of the rotary tubular bearing part, and said lever having a slot, a projection on the cranked rod projecting through the slot, switch blades carried by the cranked rod, switch terminals in the base part of the casing, stops on the side wall of the cover for the lever arm to bear against when in the "current on" and "current off" positions, and a further stop on the cover for the cranked rod to bear against when in the "current off" position, as set forth.

2. In iron-clad electric switches, a metal casing comprising a base and cover and means for hinging said parts to each other, a cranked rod mounted transversely in the cover of the casing, tubular parts let into the side walls of cover, one fixed and the other rotatable, and in which the ends of the cranked rod take their bearing, a handle secured to the rotary tubular part outside the casing, and said rotary tubular part carrying the handle having on that end inside the casing peripheral shoulders, a cranked lever arm secured to the rotary tubular part and a spring connected at one end to the end of the lever arm and at its other end secured to the cranked part of the said cranked rod, a lever pivotally mounted on the side wall of the base of the casing, with one end adjacent to one of the peripheral shoulders of the rotary tubular bearing part, and said lever having a slot, a projection on the cranked rod projecting through the slot, switch blades carried by the cranked rod, switch terminals in the base part of the casing, stops on the side wall of the cover for the lever arm to bear against when in the "current on" and "current off" positions, and a further stop on the cover for the cranked rod to bear against when in the "current off" position, a projection on the side wall of the base of the casing, and said slotted lever, pivoted to the cover, having an extension bent toward the base of the casing and designed, when the casing is closed and the current switched on, to pass behind the said projection and lock the cover, and when the casing is open with the cranked rod in the "current on" position to meet the edge of the block and prevent the reclosing of the cover, as set forth.

In witness whereof I have hereunto set my hand in the presence of two witnesses.

VERNON HOPE.

Witnesses:
F. C. PENNINGTON,
J. BARKER.